Sept. 2, 1941.  R. E. ZERUNEITH  2,254,255
MATERIAL UNWINDING, GUIDING, AND TENSIONING STRUCTURE
Filed June 5, 1939  3 Sheets-Sheet 1
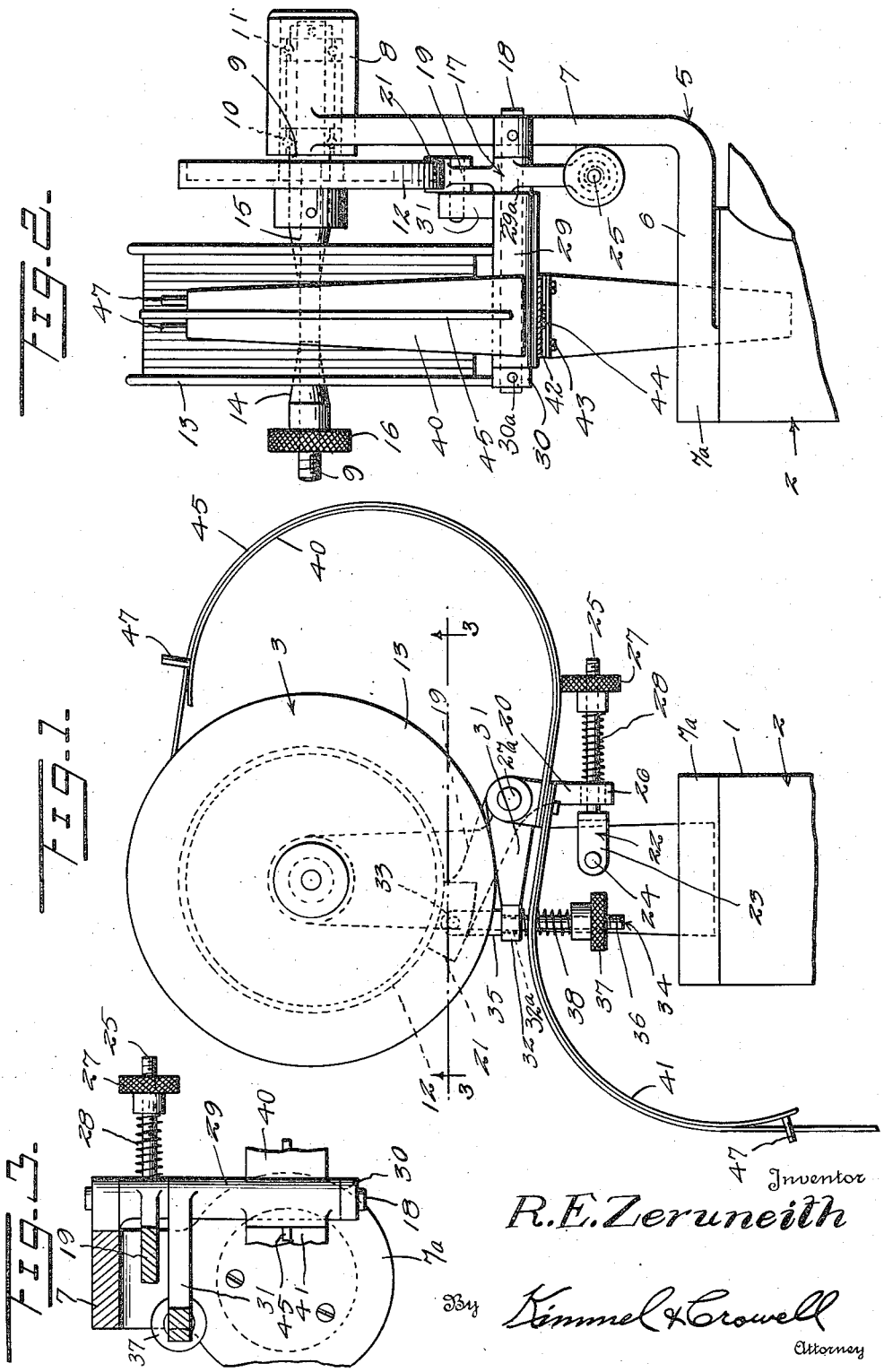
Inventor
R. E. Zeruneith
By Kimmel & Crowell
Attorney Sept. 2, 1941.                R. E. ZERUNEITH                2,254,255
           MATERIAL UNWINDING, GUIDING, AND TENSIONING STRUCTURE
                   Filed June 5, 1939            3 Sheets-Sheet 2
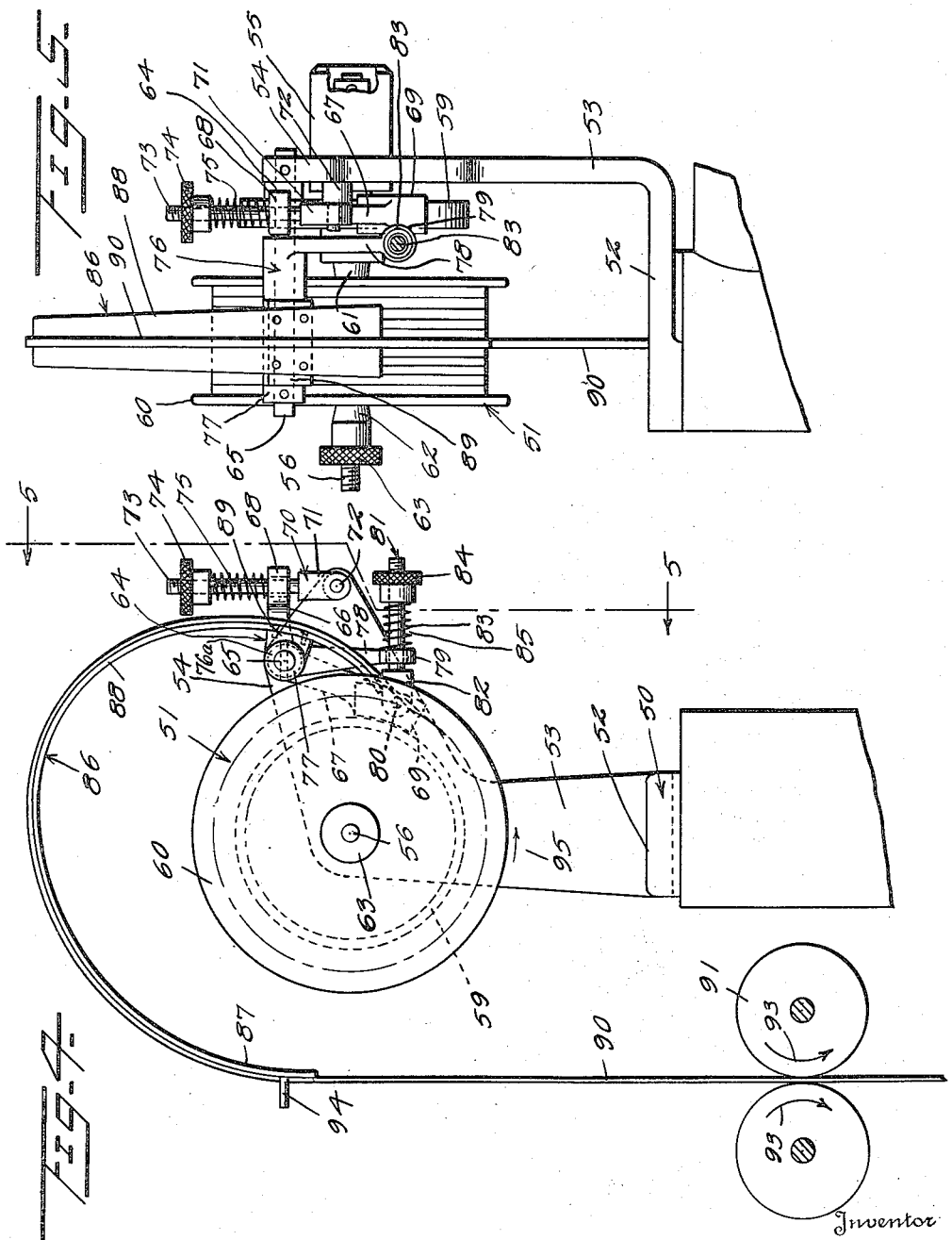
Inventor
R. E. Zeruneith
By Kimmel & Crowell
Attorneys Sept. 2, 1941. R. E. ZERUNEITH 2,254,255
MATERIAL UNWINDING, GUIDING, AND TENSIONING STRUCTURE
Filed June 5, 1939 3 Sheets—Sheet 3
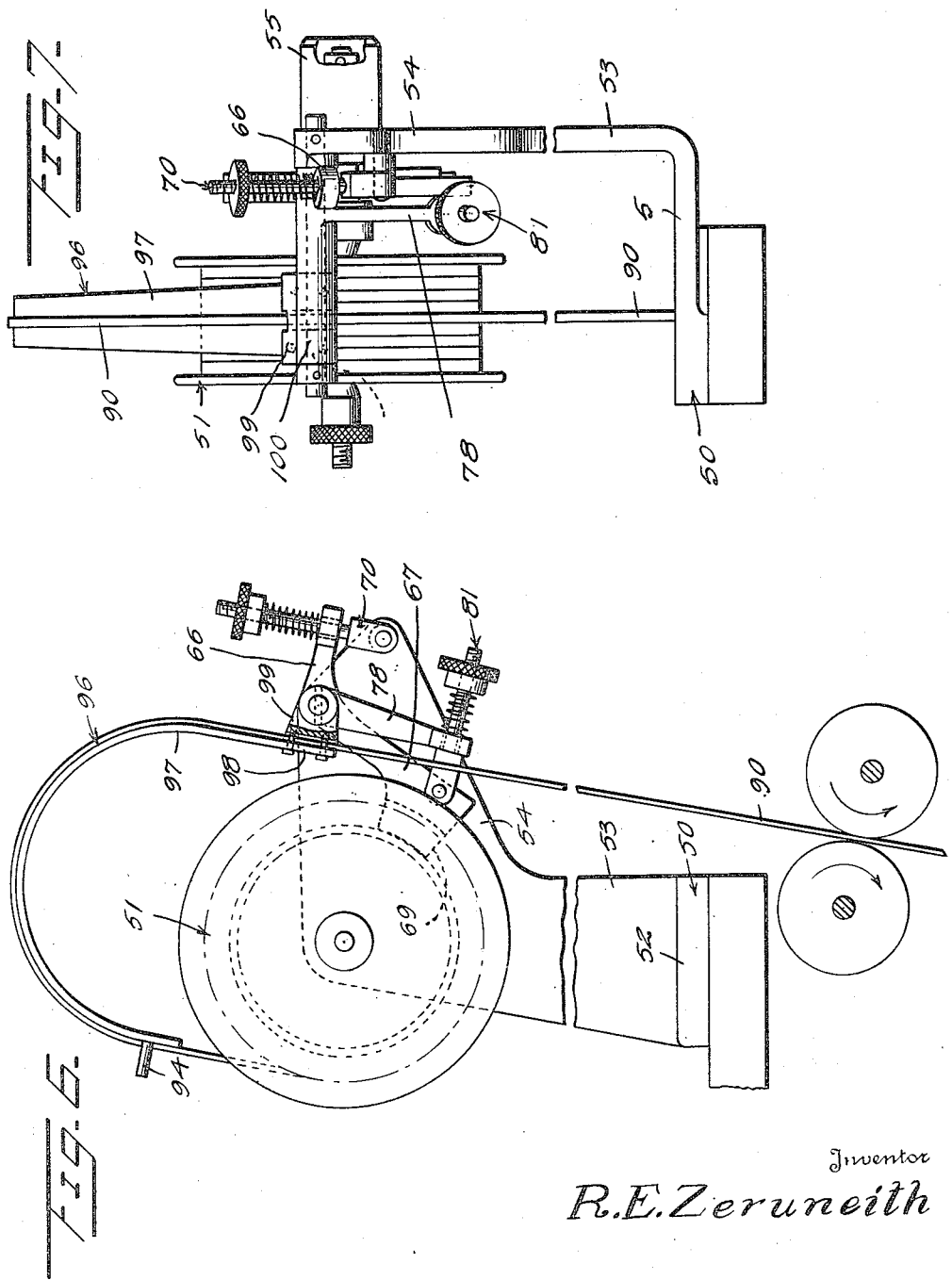
Inventor
R. E. Zeruneith
By Kimmel & Crowell
Attorney Patented Sept. 2, 1941

2,254,255

UNITED STATES PATENT OFFICE 2,254,255

MATERIAL UNWINDING, GUIDING, AND TENSIONING STRUCTURE

Rudolph E. Zeruneith, New York, N. Y.

Application June 5, 1939, Serial No. 277,511

3 Claims. (Cl. 242—156)

This invention relates to an unwinding, guiding, tensioning and supplying structure or mechanism for wire, textile, paper and other webs, threads, ribbons and the like, and is designed primarily for use in connection with a wire stitching machine, but it is to be understood that it may be associated with numerous other machines in other arts wherein a controlled unwinding of the material fed thereto is desired, and this irrespective of whether the material on the spool or reel is to be unwound continuously or intermittently.

The invention has for its objects to provide in a manner as hereinafter set forth an efficient structure for operatively unwinding, guiding and supplying material from a spool or reel in a controlled manner and under a state of tension to prevent slack.

The invention has its further object to provide a structure for the purpose referred to including a reel or spool for supporting the material, a tension braking means for applying braking pressure to the reel or spool, and a tensioned brake pressure modifying means connected with and co-acting with the said other means for lessening the braking pressure to an extent and over a period, corresponding to the extent and duration of a downward pull on the material, thereby permitting the unwinding of just enough material to meet the machine's requirements, and no more, thereby permitting the spool or reel to unwind at a rate determined solely by the requirements of the machine with which the spool is associated, and will not break the material, nor permit the material to run wild and become tangled.

Further objects of the invention are to provide, in a manner as hereinafter set forth a structure for the purpose referred to which is comparatively simple in its construction and arrangement, strong, durable, compact, thoroughly efficient in its use, capable of being quickly repaired when the occasion requires, conveniently installed with respect to the machine with which it is associated, and comparatively inexpensive to set up.

Embodying the objects aforesaid and others which may hereinafter appear, the invention consists of the novel construction, combination and arrangement of parts to be more specifically referred to and illustrated in the accompanying drawings, wherein is shown an embodiment of the invention, but it is to be understood that changes, variations and modifications may be resorted to which fall within the scope of the invention as claimed.

For the purpose of illustrating the invention the latter is shown, by way of example as a structure for use in unwinding, guiding, tensioning and supplying wire for a wire stitching machine.

In the drawings, wherein like reference characters denote corresponding parts:

Figure 1 is a front elevation of an unwinding, guiding, tensioning and supplying structure in accordance with this invention showing the same installed, with respect to a wire stitching machine and further illustrating the material which is unwound, guided, tensioned and supplied thereby in the form of wire, Figure 2 is a side elevation looking towards the right side of the structure shown in Figure 1, Figure 3 is a section on line 3—3, Figure 1, Figure 4 is a front elevation of a modified form, Figure 5 is a section on line 5—5, Figure 4, Figure 6 is a front elevation of still another modified form, and Figure 7 is a fragmentary view in side elevation of the structure shown by Figure 6.

With reference to Figures 1, 2 and 3 there is shown a portion 1, of a wire stitching machine 2 with which, by way of example the unwinding, guiding, tensioning and supplying structure, in accordance with this invention is associated.

The structure as aforesaid is generally indicated at 3 and it includes an angle shaped bracket 5 having a horizontally disposed lower arm 6 and a vertically disposed upper arm 7. The bracket 5 is to be suitably connected to the portion 1 of the machine 2 and, by way of example bracket 5 is illustrated as having its arm 6 integral with a plate 7ª which is suitably secured or connected with the portion 1 of the machine 2. In my copending application Serial No. 273,105, filed May 11, 1939, the bracket 5 is illustrated as being integral with a plate bolted or otherwise secured on the top of a trunnion. It is to be understood that the bracket 5 may be secured to any suitable part of the machine 2, whether the bracket 5 be connected to or integral with such part.

The upper end of arm 7 terminates in a sleeve or bearing housing 8, within which is journaled a freely rotatable spindle 9 of greater length than and which extends from the inner end of sleeve 8. The spindle 9, within the sleeve 8 extends through a pair of spaced antifriction bearings 10, 11 and that portion of the spindle 9 projecting from the sleeve 8 has keyed or otherwise fastened thereto a brake drum 12. A wire or thread supply spool or reel 13 is slipped over the outer free end of the spindle 9 and is centrally held thereon by the relatively approachable tapered seats 14, 15, one of which is formed integral with the brake drum and the other provided by the inner end terminal portion of a rotatable sleeve-like clamping nut 16 which threadedly engages the threaded free end of the spindle 9.

A bell crank lever 17 is journaled on a fixed shaft 18 extended laterally from the vertical arm 7 of the bracket 5. The lever 17 is formed of an inclined upper arm 19 and a vertical lower arm 20. The arm 19 extends upwardly and inwardly with respect to the upper end of the arm 20. The upper end of the arm 19 is enlarged and of curved contour to constitute a brake shoe 21. The shoe 21 is of segmental contour and it extends laterally from both sides of the arm 19. There is correlated with the lever 17 for coaction with the brake shoe 21 a tensioning device consisting of a horizontally disposed supporting member 22 formed of a head 23 pivotally secured, at its inner end to the bracket arm 7, as at 24. The member 22 includes a reduced peripherally threaded shank portion 25 integral with the head 23 and extended laterally therefrom. The stem 25 passes through an opening 26 formed in the lower end of the arm 20 of the lever 17. The said arm 20 is slidably mounted on the stem 25. Slidably engaging with the stem 25 is an adjustable nut 27 and encompassing the stem 25 and interposed between the lever arm 20 and the nut 27 is a coiled tensioning spring 28. The nut 27 provides for increasing and decreasing the tension of the spring 28. The lower end of the lever arm 20 opposes the outer end of the head 23 of the member 22. The tensioning device aforesaid preferably normally exerts a sufficient force on the bell crank lever 17 to cause the brake shoe 21 to bear against the brake drum 12 with sufficient pressure to prevent rotation of the spindle 9 and accordingly the spool or reel 13.

A sleeve 29 is journaled on the fixed shaft 18 adjacent the hub 29ª of the bell crank lever 17 and said sleeve 29 is prevented from sliding off of shaft 18 by a retaining collar 30 attached, by a pin 30ª, to the inner end of shaft 18 in proximity to the inner end of sleeve 29. That end of sleeve 29 disposed adjacent to the hub 29ª of lever 17 has extending laterally therefrom a tapered crank arm 31, provided with a horizontally disposed enlarged outer end 32 formed with a vertical opening 32ª. Secured to one side of the brake shoe 21, as at 33 is a vertically disposed supporting member 34 formed of a head 35 and a threaded stem 36 which is of reduced thickness with respect to the head 35. The head 35 seats on the enlarged outer end 32 of the arm 31. The stem 36 extends downwardly through the opening 32ª and has threadedly engaging with its lower end portion an adjusting nut 37. Surrounding the stem 36 and interposed between the enlarged outer end 32 of the arm 31 and the nut 37 is a tension spring 38. The tension of the spring 38 is adjusted by the nut 37.

The bell crank lever 17 and the arrangement of the parts 22 to 27 both inclusive with respect to the arm 20 of the lever 17 provides what may be termed a braking pressure applying means. The arm 31 and the arrangement of the parts 34 to 38 both inclusive relative to said arm 31 provides what may be termed a braking pressure modifying means. The unwinding, guiding, tensioning and supplying structure includes a pair of oppositely disposed flexible curved guides of suitable material and which are in the form of upper and lower leaf springs 40, 41 respectively. The lower terminal portion of the spring 40 is arranged in superposed spaced overlapping relation with respect to the upper terminal portion of the spring 41 and such terminal portions are secured to the under side of the sleeve 29 in spaced relation with respect to the arm 31. Arranged between the said overlapped terminal portions of said springs are spaced spacer plates 42, which are held by screws 43 in a manner to provide a central channel 44 through which the material, wire 45 as shown by way of example travels from off of the outer face of the spring 40 onto the outer face of the spring 41 when the material is being unwound from the spool 13.

A pair of spaced parallel pins 47 are disposed at the leading end of the upper spring 40 and at the trailing end of the lower spring 41, so as to prevent the material from slipping off of either of these springs in transit thereover. If desired, the number of pairs of spaced material guiding pins used may be increased to suit the particular requirements and curvature of the leaf springs.

The material 45, wire strand as shown is to be intermittently unwound from the spool 13 by means of the wire feeding mechanism, not shown, of the stitching machine. The wire feeding mechanism is of the type to intermittently or periodically grasp the material on opposite sides and pull it downwardly to an extent determined by the relatively angular dispositions of the wire grasping portions of said mechanism and in this connection attention is directed to my copending application Serial No. 273,105, filed May 11, 1939. The wire grasping portions are carried by a pair of continuously rotating feed rolls forming elements of the feed mechanism. This feeding operation occurs once for each complete revolution of the feed rolls of the feeder mechanism, and accordingly the material or wire strand 45 is intermittently pulled downwardly and advanced.

Accordingly, at least part of the material or wire strand 45 fed downwardly by the wire feed mechanism at each revolution of the feed rolls, is drawn from a portion of the material or wire strand 45 contacted by the leaf springs 40, 41. Thus, as the strand 45 is pulled downwardly the springs 40, 41 flex inwardly in a counter clockwise direction due to the tensioning of the superimposed strand. The resulting increased torque asserted on the overlapping ends of these leaf springs 40, 41 rotates the sleeve 29 and its associated arm 31 in a counter clockwise direction. As long as head 35 is held in contact with arm 31, all the wire is being fed due to the flexing of the springs 40 and 41. If the tension set up by these springs is insufficient to overcome the full braking pressure of shoe 21 against brake drum 12, then in that case the spool will rotate in a clockwise direction and pay out wire against the full brake pressure. If however the brake pressure is too great to permit this, then the downward pull on the wire will cause crank arm 31 to rotate in a counter-clockwise direction whereby end 32 of crank arm 31 will leave head 35. Up to this point and due to the fact that crank arm 31 has been contacting head 35, the arms 19 and 20 of the lever 17 have acted as one contiguous unit and the full tension of spring 28 has been exerted on drum 12 by brake shoe 21. No modifying effect can be exerted by spring 38 until crank arm 31 leaves head 35 and starts to rotate thereby shortening spring 38.

The unit is now split into two separate halves each opposing the other. The arm 19 of lever 17 is supported by spring 28, the reaction being taken by the bracket 7 through pin 24. The crank arm 31 is supported by spring 38 which is opposed by the pull on wire 45 and the reaction is taken by brake shoe 21 through head 35 and in turn by spring 28. Spring 38 now exerts a pressure against and in opposition to spring 28 making the total brake pressure exerted against the drum equal to the pressure of spring 28 minus the pressure of spring 38. The further crank arm 31 is swung in the counter clockwise direction, the greater the spring 38 will be compressed, the less the difference in the spring pressure will be which is exerted by the two springs, resulting in an ever decreasing pressure between the brake shoe and the drum 12. When this brake pressure has been reduced to a point where the tension set up in the leaf springs 40 and 41 equals and overcomes it, then the spool will start to rotate and pay out wire until the tension of spring 28 again overcomes tension in springs 40 and 41. A point may be reached where the tension of spring 38 will be equal to the tension of spring 28 in which case the brake pressure will be off entirely. This may be caused by too tightly wound wire due to faulty winding of the coil. In this case the entire force of the downward pull on the wire will be exerted on the spool causing it to turn and again pay out wire after which an equilibrium will again be immediately restored between all the opposing forces.

The amount of wire paid out from the spool 13 for each revolution of the feed rolls is directly proportional to the length of the strand advanced by the feed rolls, since the latter determines the degree of rotation of the sleeve 29 and its associated arm 31, and therefore the decrease in braking pressure by the brake shoe 21 on the brake drum 12.

By means of the aforesaid directed arrangement, the downward pull exerted on the strand 45 results in a lessening of the braking pressure to an extent and over a period corresponding to the extent and duration of the down pull, thereby permitting the unwinding of just enough wire to meet the machine's requirements and no more. Thus, the aforesaid described arrangement permits the spool to unwind at a rate determined solely by the requirements of the machine with which the spool is associated and will not break the material, nor permit it to run wild and become tangled.

With reference to the modification shown by Figures 4 and 5 there is illustrated a material unwinding, guiding, tensioning and supplying structure of a form in which but a single guide is employed. The guide is substantially vertically disposed and of arcuate contour. The said guide may be formed of a flexible leaf spring or of rigid material. The structure shown by Figures 4 and 5 is of a type whereby the material (wire) enters the guide from the brake shoe side thereof.

As to the modification shown by Figures 6 and 7 it is of the single guide type, but with the guide so arranged that the material (wire) enters the guide on that side of the structure opposite the brake shoe side of the latter. The guide of the structure shown by Figures 6 and 7 will be substantially of the same form as the guide of the structure illustrated by Figures 4 and 5.

With reference to Figures 4 and 5 a supporting bracket is generally indicated at 50 and is to be attached to or forms a part of the machine with which the structure 51 is correlated. The bracket 50 includes a horizontal and a vertical arm or leg 52, 53 respectively. The arm 52 at one end merges into the lower end of arm 53. The upper terminal portion of the arm 53 is formed with a lateral extension 54 which extends at an upward inclination from its inner to its outer end. The upper end of arm 53 terminates in a sleeve or bearing housing 55 which is disposed at right angles to the extension 54 and extends forwardly and rearwardly relative to such end. Within the sleeve 55 is journaled a freely rotatable spindle 56 of greater length than and which extends from the inner end of the sleeve 55. That portion of the spindle 56, within the sleeve 55 is mounted in the same manner as the spindle 9 (Figure 2). That portion of the spindle 56 projecting from the sleeve 55 has keyed or otherwise fastened thereto a brake drum 59. A wire or thread supply spool or reel 60 is slipped over the outer free end of the spindle 56 and it is centrally held thereon by the relatively approachable tapered seats 61, 62, one of which is formed integral with the brake drum and the other by the inner end terminal portion of a rotatable sleeve-like clamping nut 63 which threadedly engages the free end of the spindle 56.

A bell crank lever 64 is journaled on a fixed shaft 65 which is secured to the extension 54. The shaft 65 is disposed in parallel relation with respect to the brake drum 59 and spool 60 and is disposed above the spindle 56. The lever 64 is formed of a substantially horizontally disposed upper arm 66 merging at its inner end into a depending inwardly inclined inner arm 67 which extends towards the brake drum 59. The outer end of the arm 66 is formed with a vertical opening 68. The lower end of the arm 67 is enlarged and of curved contour to constitute a brake shoe 69. The latter is of segmental contour and it extends from both sides of the arm 67. There is correlated with the lever 64 for coaction with the brake shoe 69 a tensioning device consisting of an upstanding supporting member 70 formed of a head or lower end 71 which is connected with the extension 54, as at 72. The member 70 also is formed with a reduced peripherally threaded stem or shank portion 73 integral at its lower end with the head 71. The stem 73 extends upwardly through the opening 68 of the arm 66 of the lever 64. The arm 66 is slidable relative to the stem 73. Threadedly engaging with the upper end of the stem 73 is an adjustable nut 74 and encompassing the stem 73 and interposed between the outer end of the lever arm 66 and the nut 74 is a coiled tensioning spring 75. The nut 74 provides for increasing and decreasing the tension of the spring 75. The lower face of the outer end of lever arm 66 opposes the upper face of the head 71 of the member 70. The tensioning device aforesaid preferably normally exerts a sufficient pull on the bell crank lever 64 to cause the brake shoe 69 to bear against the brake drum 59 with sufficient pressure to prevent rotation of the spindle 56 and accordingly the spool or reel 60.

A sleeve 76 is journaled on the fixed shaft 65 adjacent the hub 76ª of the bell crank lever 64 and the said sleeve 76 is prevented from sliding off of the shaft 65 by a sleeve retaining collar 77. One end of the sleeve 76 has depending therefrom a crank arm 78 provided with an enlarged outer end formed with a horizontal opening 79. Secured to the enlarged lower end of the arm 67 of the bell crank lever 64, as at 80 is a substantially horizontally disposed supporting member 81 formed with a head 82 and a threaded shank or stem 83 projecting outwardly from the outer end and of reduced thickness relative to the head 82. The shank 83 extends through the opening 79 in the arm 78. The latter abuts against the head 82. Threadedly engaging with the outer portion of the shank 83 is an adjusting nut 84. Surrounding the stem 83 and interposed between the lower end of the crank arm 78 and the nut 84 is a tension spring 85. The tension of the spring 85 is adjusted by the nut 84.

The bell crank lever 64 and the arrangement of the parts 70 to 75 both inclusive with respect to the arm 66 of the lever 64 provides what may be termed a braking pressure applying means.

The sleeve 76, the crank arm 78 and the arrangement of the parts 82 to 85 inclusive provide what may be termed a braking pressure modifying means.

The structures shown by Figures 4 and 5 include an upstanding guide 86 of arcual contour which extends above the reel or spool and the side 87 of said guide has its lower end arranged adjacent that side of the reel or spool opposite the brake shoe side thereof. The side 88 of the guide 86 is of greater length than side 87 and disposed outwardly with respect to the sleeve 76 and incurved to extend towards the spool or reel 60. The side 88 of the guide 86 is secured, in proximity to its lower end to an offset 89 formed on the outer side of the sleeve 76. The strand of the wire or thread which is unwound from the reel or spool is indicated at 90 and it is unwound from the reel or spool on the brake shoe side of the latter and travels upwardly around guide 86 and then downwardly therefrom to the wire feed mechanism 91 shown diagrammatically in Figure 4. The rolls of the mechanism 91 travel to the direction of the arrows 93. The side 87 of the guide 86 in proximity to its lower end is formed with guide pins 94. The reel or spool 60 travels in the direction of the arrow 95.

With reference to Figures 6 and 7 the material unwinding, guiding, tensioning and supplying structure is substantially of the same form as the structure shown by Figures 4 and 5, with this exception. The guide 96 receives the wire strand 90 from that side of the reel or spool 60 opposite the brake shoe side of the latter. The guide 96 is set up in a different manner than the guide 86 and in this connection the side 97 of the guide 96 has its lower end 98 secured to an offset 99 on the inner side of the sleeve 100. The connection between the lower end 98 of the side 97 and the guide 96 and the offset portion 99 is so formed as to provide a passage for the strand 90.

Corresponding parts of the structures shown by Figures 4, 5, 6, 7 are provided with like reference characters.

The braking pressure applying means and the braking pressure modifying means of the structure shown by Figures 4 and 5 and the structure shown by Figures 6 and 7 functions in the same manner and for the same purpose as the braking pressure applying and the braking pressure modifying means which form elements of the structure shown by Figures 1, 2 and 3.

What I claim is:

1. In a material unwinding, guiding, tensioning and supplying mechanism, a rotatable structure including a brake drum and a reel carrying the material and from which it is unwound, said drum and reel rotating in unison, guiding means for and upon the outer face of which travels the unwound material, a brake shoe for the drum, a pivoted braking pressure applying means for the drum and carrying said brake shoe, and a pivoted braking pressure modifying means connected to the brake shoe, said material guiding means being secured to said braking pressure modifying means, said guiding means consisting of upper and lower oppositely disposed curved leaf springs, the lower terminal of the upper spring being disposed in overlapping spaced relation with respect to the upper terminal of the lower spring to thereby provide a passage for directing the unwound material from off of the outer face of the upper spring onto the upper face of the lower spring.

2. In a material unwinding, guiding, tensioning and supplying mechanism, a rotatable structure including a brake drum and a reel carrying the material and from which it is unwound, said drum and reel rotating in unison, guiding means for and upon the outer face of which travels the unwound material, a brake shoe for the drum, a pivoted braking pressure applying means for the drum and carrying said brake shoe, a pivoted braking pressure modifying means connected to the brake shoe, said material guiding means being secured to said braking pressure modifying means, and a fixed shaft located adjacent to said structure and common to the said braking pressure applying means and the said braking pressure modifying means, said guiding means consisting of upper and lower oppositely disposed curved leaf springs, the lower terminal of the upper spring being disposed in overlapping spaced relation with respect to the upper terminal of the lower spring to thereby provide a passage for directing the unwound material from off of the outer face of the upper spring onto the upper face of the lower spring.

3. In a material unwinding, guiding, tensioning and supplying mechanism, a rotatable reel carrying the material and from which the latter unwinds, a pair of resilient oppositely disposed material guides for the travel thereon of the material unwound from the reel and arranged relatively to each other to form a passage for directing the unwound material from a like position on one guide to a like position on the other, a brake drum correlated with said reel, a pivoted spring controlled adjustable braking pressure applying means for said drum including a brake shoe, and a pivoted spring controlled adjustable braking pressure modifying means connected to said brake shoe.

RUDOLPH E. ZERUNEITH.